C. F. GREEN AND H. W. LINDSEY, Jr.
FUEL RESERVE SUPPLY SYSTEM.
APPLICATION FILED NOV. 18, 1918.
1,379,812.
Patented May 31, 1921.
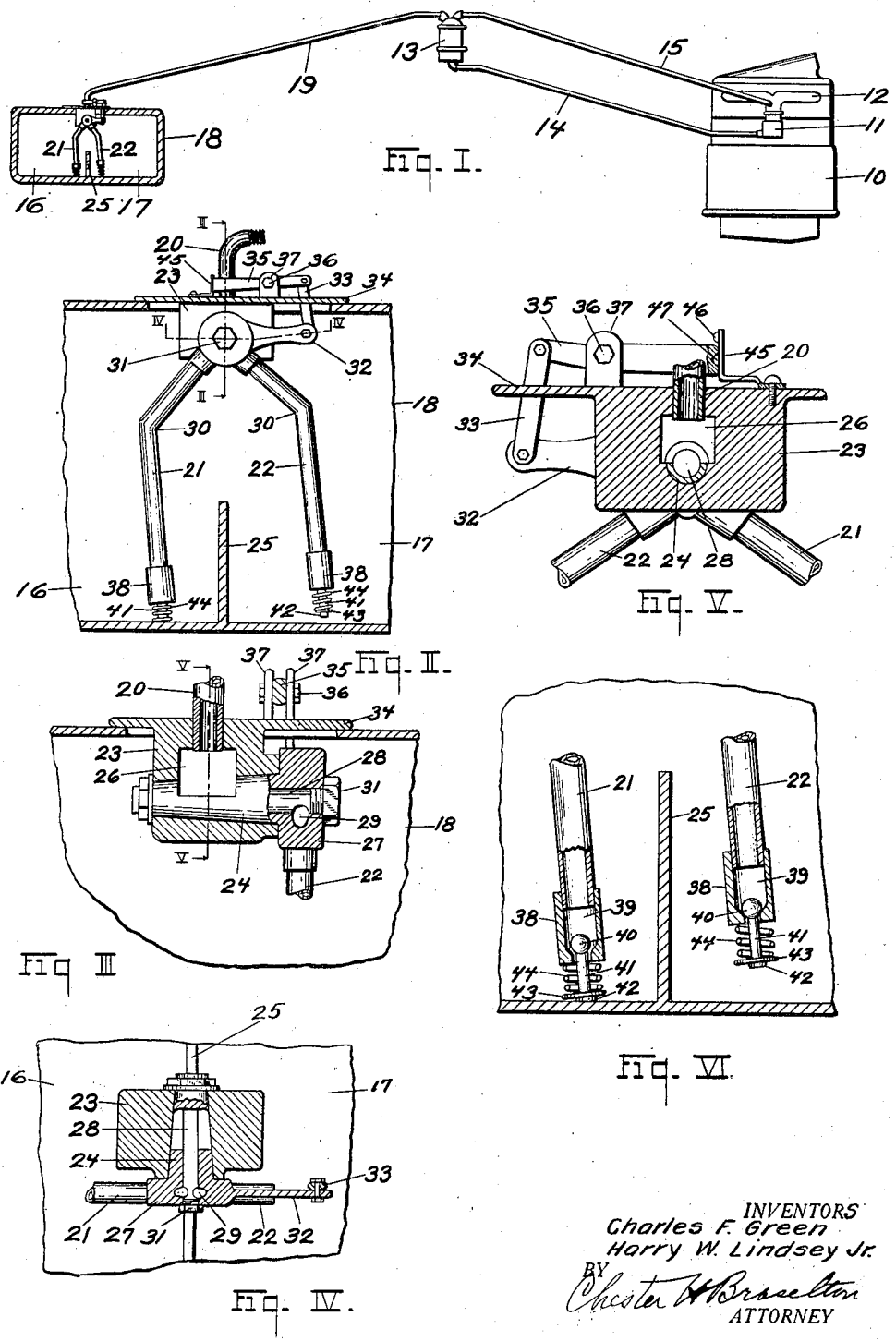
INVENTORS
Charles F. Green
Harry W. Lindsey Jr.
BY
ATTORNEY

UNITED STATES PATENT OFFICE.

CHARLES F. GREEN, OF DEFIANCE, AND HARRY W. LINDSEY, JR., OF TOLEDO, OHIO, ASSIGNORS TO INDUSTRIAL RESEARCH CORPORATION, OF TOLEDO, OHIO, A CORPORATION OF DELAWARE.

FUEL-RESERVE-SUPPLY SYSTEM.

1,379,812. Specification of Letters Patent. Patented May 31, 1921.

Application filed November 18, 1918. Serial No. 262,994.

*To all whom it may concern:*

Be it known that we, CHARLES F. GREEN and HARRY W. LINDSEY, Jr., citizens of the United States, residing at Defiance, county of Defiance, State of Ohio, and Toledo, county of Lucas, State of Ohio, respectively, have invented certain new and useful Improvements in Fuel-Reserve-Supply Systems, of which we declare the following to be a full, clear, and exact description.

Our invention relates to improvements in fuel reserve supply systems of the type shown in our co-pending application filed November 18, 1918, bearing Serial Number 262,995 and has for its object to provide simple and effective means for maintaining a reserve supply of fuel in the main supply tanks of motor driven vehicles.

A further object of the invention is to provide separate fuel compartments from which fuel may be alternately drawn or forced through a conduit leading to the manifold or carbureter of the engine.

A still further object of the invention is to provide a main fuel supply tank having oppositely arranged compartments into which project pivotally mounted conduits having automatically controlled valves for alternately opening and closing said conduits when shifted from one position of adjustment to another, said conduits being connected with a suitable source of suction for drawing the fuel from said compartments.

A further object of the invention is to provide a main fuel supply tank for motor driven vehicles connected through the vacuum fuel feed tank with the carbureter or manifold of the engine, said main tank having separate compartments with means for alternately forcing fuel from said compartments to said vacuum fuel feed tank through a single connection leading thereto.

To these and other ends the invention comprises certain novel features of construction and arrangement of parts as will be hereinafter more fully described and claimed, it being understood that various changes may be made in the manner of constructing and operating the apparatus without departing from the spirit of the invention.

A construction illustrating one embodiment of the invention is shown in the accompanying drawings forming a part of the specification in which:

Figure I is a diagrammatic view illustrating the preferred embodiment of the invention.

Fig. II is a fragmentary sectional elevation illustrating the manner of adjustably mounting the connected conduits extending into the opposite compartments of the main fuel supply tank.

Fig. III is a sectional elevation taken on the line III—III of Fig. II.

Fig. IV is a sectional plan taken on line IV—IV of Fig. II.

Fig. V is a sectional elevation taken on line V—V of Fig. III, and

Fig. VI is an enlarged fragmentary sectional view showing the manner of constructing and mounting the valves for alternately opening and closing the suction conduits projecting into the tank.

Like reference characters indicate like parts in the several views of the drawings.

Referring to the drawings 10 represents any preferred type of engine suitable for motor driven vehicles, the carbureter and manifold thereof being indicated at 11 and 12 respectively.

A vacuum gravity feed tank 13 of any well known design is connected with the carbureter and manifold of the engine by means of the conduits 14 and 15 respectively as shown in Fig. I, the vacuum tank being also connected with the separate compartments 16 and 17 of the main fuel supply tank 18 by means of the conduit 19, short pipe 20 and branch pipes 21 and 22 through the casing 23 and pivoted member 24 as best shown in Fig. III of the drawings. The compartments 16 and 17 are preferably formed by extending upwardly from the bottom of the main supply tank the partition 25 as shown in Fig. II, but said compartments may be constructed in any other desired manner. The casing 23 is provided with a chamber 26 in which the member carrying the branch pipes is pivotally mounted, the opposite ends of said member being journaled in the side walls of the casing as shown in Fig. III, and being preferably tapered and provided with an enlarged head 27 having a longitudinal bore 28 communicating with the chamber 26 through the centrally cut portion of the member as shown in Figs. III and V.

Leading from the outer end of the bore 28 are angularly disposed passageways 29 which are adapted to communicate with the conduits 21 and 22, the latter being preferably screwed into the head 27 at an angle to the vertical and bent as indicated at 30 to extend into the tank on opposite sides of the partition 25 or substantially so. The bore 28 is preferably extended through the head 27 and closed by a screw-plug 31 as shown in Fig. III.

Extending from one side of the head 27 and preferably integral therewith is an arm 32 carrying an upstanding link 33 extending through the plate 34 and pivotally connected with one end of a horizontally disposed lever 35 which is pivoted at 36 between the uprights 37 of the plate 34 as clearly shown in Figs. II and III.

Upon the bottom ends of the branch pipes or conduits 21 and 22 are secured the valve housings or casings 38 which are preferably screwed upon the conduits and have in their lower ends the fuel inlet openings 39 adapted to be alternately opened and closed by the valves 40 on the stems 41 which project downwardly from the housings as shown in Fig. VI. The stems 41 at their lower ends are provided with heads 42 upon which rest the spring seats 43 for supporting the lower ends of the springs 44, the upper ends of which are seated upon the housings as clearly shown in Figs. II and VI. It will be understood that the springs retain the valves in closed position as long as the stems are out of contact with the bottom of the tank which coöperates with the stems to open the valves when the conduits are lowered a predetermined amount.

In order to prevent the accidental displacement of the lever 35 and hence displacement of the conduits 21 and 22 an upstanding spring 45 is provided on the casing 23 having upper and lower projections 46 and 47 respectively, one of which is adapted to engage the end of the lever 35 in a recess formed therein as shown in Fig. V when said lever is in one position of adjustment and the other when said lever is in another position of adjustment.

In the operation of our improved fuel reserve supply apparatus when the engine stops by reason of the fact that all of the fuel in one of the compartments has been consumed, the driver is only required to operate the lever 35 to shift thec onduits or branch pipes 21 and 22 from one position of adjustment to another until the open valve in the compartment from which the engine has been using fuel is automatically closed and the opposite closed valve in the other compartment automatically opened.

Having thus described our invention, what we claim as new and desire to secure by Letters Patent is:

1. A device of the class described, comprising a tank having oppositely arranged liquid holding compartments, a pivoted recessed member having connections movable within the tank and adapted to alternately communicate with each of said compartments when in different positions of adjustment, and means for adjusting said member relatively to said tank.

2. A device of the class described, comprising a tank having oppositely arranged liquid holding compartments, a pivoted member having connections movable within the tank and adapted to alternately communicate with each of said compartments when in different positions of adjustment, means for adjusting said member relatively to said tank, and a suction conduit communicating with said pivoted member.

3. A device of the class described, comprising a tank having oppositely arranged liquid holding compartments, a conduit leading to said tank, an adjustable member communicating with and movable relative to said conduit and having a branch pipe leading to and movable within each of said compartments, and means for effecting the alternate opening and closing of said branch pipes upon movement of said adjustable member in opposite directions.

4. A device of the class described, comprising a tank having oppositely arranged liquid holding compartments, a conduit leading to said tank, an adjustable member communicating with and movable relative to said conduit and having branch pipes movable therewith and leading to said compartments, means for effecting the alternate opening and closing of said branch pipes upon movement of said adjustable member in opposite directions, and a suction producing apparatus connected with said conduit.

5. A device of the class described, comprising a tank having oppositely arranged liquid holding compartments, a conduit leading to said tank, an adjustable member communicating with and movable relative to said conduit and having a branch pipe leading to each of said compartments, valves coöperating with said branch pipes to control the supply of liquid therethrough, a lever connected with said adjustable member for moving the same to effect the alternate opening and closing of the valves, and an aspirator connected with said conduit.

6. A device of the class described, comprising a tank having oppositely arranged liquid holding compartments, a fixed conduit leading to said tank, an adjustable branch pipe leading to each of said compartments and communicating with said conduit, valves coöperating with said branch pipes to control the supply of liquid therethrough, means for moving said branch pipes to effect the alternate opening and closing of said valves, and an aspirator connected with said conduit.

7. A device of the class described, comprising a tank having oppositely arranged liquid holding compartments, a conduit leading to said tank, an adjustable member communicating with and movable relative to said conduit and having a branch pipe leading to each of said compartments, spring-seated valves coöperating with said tank and said branch pipes to control the passageways therethrough, means for moving said adjustable member to effect alternate opening and closing of the valves, and an aspirator connected with said conduit.

8. A device of the class described, comprising a fuel tank having a partition therein, a conduit leading to the tank, an adjustable member movable relative thereto and communicating with said conduit and having a branch pipe leading to each side of said partition, means for actuating said adjustable member, and means for effecting the alternate opening and closing of said branch pipes upon movement of said adjustable member in opposite directions.

9. A device of the class described, comprising a fuel tank having a partition therein, a conduit leading to the tank, a pivotally mounted adjustable member communicating with said conduit and having a branch pipe leading to each side of said partition, spring seated valves upon said pipes coöperating with the tank to alternately open and close said branch pipes, and means for moving said adjustable member from one position of adjustment to another.

10. A device of the class described, comprising a fuel tank having a partition therein, a recessed member upon said tank, a conduit leading to said recessed member, an adjustable member upon said recessed member movable relative thereto and communicating with said conduit and having a branch pipe leading to each side of the partition, valves for alternately opening and closing said pipes when said adjustable member is in different positions, and means for actuating said adjustable member from one position of adjustment to another.

11. A device of the class described, comprising a fuel tank having a partition dividing the lower portion thereof into two compartments, a conduit leading to said tank, a pivotally mounted member communicating with said conduit and having a branch pipe leading to each of said compartments, spring-seated valves upon said pipes coöperating with the tank to alternately open and close the pipes upon movement of said pivoted member in opposite directions, means for shifting the position of said pivoted member, and a suction producing apparatus connected with said conduit.

12. A device of the class described, comprising a fuel tank having a partition therein, a conduit leading to said tank, a pivotally mounted member communicating with said conduit, a branch pipe extending from said pivotally mounted member into the tank on each side of the partition, means coöperating with the tank to alternately open and close each of said branch pipes upon movement of said pivotally mounted member from one position of adjustment to another, and a lever operatively connected with said pivotally mounted member for adjusting the same.

13. A device of the class described, comprising a fuel tank having a partition therein, a conduit leading to the tank, a pivotally mounted member communicating with the conduit and provided with a branch pipe extending into the tank upon each side of the partition, means coöperating with the tank to alternately open and close said branch pipes upon movement of said pivotally mounted member from one position of adjustment to another, an arm upon said pivotally mounted member, and a lever operatively connected with said arm.

14. A device of the class described, comprising a liquid fuel tank, a pivotally mounted conduit extending therein, a spring-seated valve coöperating with and movable relative to the tank to open and close said conduit when in different positions of adjustment, and a lever operatively connected with said conduit for shifting the same.

15. A device of the class described, comprising a liquid holding tank, a recessed member thereon, a conduit leading to said member, a pivotally mounted member within said recessed member communicating with said conduit through said recessed member, a partition in said tank, branch pipes extending from said pivotally mounted member to the opposite sides of said partition, means for actuating said pivotally mounted member, and means for effecting the alternate opening and closing of said branch pipes upon movement of said pivotally mounted member in opposite directions.

16. The combination with a suction producing apparatus and a vacuum gravity tank connected therewith, of a liquid fuel supply tank having a partition therein, a conduit connecting said gravity feed tank and said supply tank, a pivoted member communicating with said conduit and having a branch pipe extending into said supply tank upon each side of said partition, and means for effecting the alternate opening and closing of said branch pipes upon movement of said pivoted member in opposite directions.

17. The combination with a suction producing apparatus and a vacuum gravity feed tank connected therewith, of a liquid fuel supply tank having oppositely arranged compartments, a conduit leading from said gravity feed tank to said supply tank, a pivotally mounted member communicating with said conduit and provided with a connection extending into each of said compartments, and means coöperating with said supply tank to alternately open and close said connections upon movement of said pivotally mounted member in opposite directions.

18. The combination with the manifold and carbureter of an automobile engine and a vacuum gravity feed tank connected therewith, of a liquid fuel supply tank, a pivotally mounted member therein, a conduit between said member and said feed tank, connections carried by said pivotally mounted member projecting into said supply tank, and means independent of said pivotally mounted member for alternately opening and closing said connections upon movement of said pivotally mounted member in opposite directions.

19. The combination with the manifold and carbureter of an automobile engine and a vacuum gravity feed tank having connections leading to said manifold and carbureter, of two separate liquid holding compartments, pivotally mounted adjustable connections extending into said compartments, a conduit between said connections and said feed tank, a valve for each of said connections within said compartments, means for adjusting the connections to alternately open and close said valves, and means for locking said adjusting means.

20. The combination with the manifold and carbureter of an automobile engine and a vacuum feed tank having connections leading to said manifold and to said carbureter, of a liquid fuel supply tank having a partition therein, a conduit connecting said tanks, a pivotally mounted member connected with said conduit and having a branch pipe extending into said supply tank upon each side of said partition, and means coöperating with said supply tank for effecting the alternate opening and closing of said branch pipes upon movement of said pivotally mounted member in opposite directions.

21. The combination with the manifold and carbureter of an automobile engine and a vacuum gravity tank having connections leading to said manifold and carbureter, of a liquid fuel supply tank having a partition therein, a conduit connecting said tanks, a pivotally mounted member communicating with said conduit, said member having two branch pipes fixed thereon, one of which extends into the supply tank upon one side of the partition and the other upon the opposite side thereof, a spring-seated valve for each of said branch pipes, and means for adjusting said pivotally mounted member to cause said supply tank to effect the alternate unseating of said valves.

22. A device of the class described, comprising the combination of a fuel tank having oppositely arranged fuel compartments, a conduit leading to said tank, an aspirator connected with said conduit, a plurality of connections pivotally mounted to communicate with said conduit and adapted to project into said compartments, means for shifting the position of said connections, and means for effecting the alternate opening and closing of the same when shifted.

23. A device of the class described, comprising the combination of a fuel tank having oppositely arranged fuel compartments, a conduit leading to said tank, a suction apparatus connected with said conduit, a plurality of connections pivotally mounted to communicate with said conduit and adapted to project into said compartments, and means coöperating with the tank for effecting the alternate opening and closing of the connections when shifted.

24. A device of the class described, comprising a liquid holding tank, a recessed member thereon, a conduit leading to said recessed member, an aspirator connected with said conduit, a pivotal member upon said recessed member having a passageway communicating with said conduit, a connection carried by said pivotal member adapted to project into said tank and communicating with said passageway, means for effecting the alternate opening and closing of said connection when in different predetermined positions of adjustment, and means for moving said pivotal member in opposite directions.

25. A device of the class described, comprising a liquid holding tank having a partition therein, a recessed member upon the tank, a suction conduit leading to the recessed member, an adjustable member pivotally mounted upon said recessed member and having a passageway communicating with said conduit through the recessed member, connections carried by said adjustable member adapted to communicate with said passageway and projecting into the tank upon opposite sides of said partition, spring-seated valves upon said connections having stems adapted to engage said tank to effect the opening of the valves when said connections are moved from one position of adjustment to another, and means for actuating said pivotally mounted member to effect adjustment of said connections.

26. A device of the class described, comprising a liquid holding tank having a partition therein, a recessed member upon the tank, a suction conduit leading to said recessed member, an adjustable member pivotally mounted upon said recessed member having a passageway communicating with said conduit through the recessed member, connections carried by said adjustable member adapted to communicate with said passageway and projecting into the tank upon opposite sides of said partition, valves upon said connections adapted to be alternately opened and closed when said connections are moved from one position of adjustment to another, a lever pivoted upon said tank, an arm upon said adjustable member, and a link connecting said arm and lever.

27. A device of the class described comprising a fuel tank having an outlet passageway and a connection mounted to swing within the tank and arranged to communicate with said passageway and adapted to be closed when moved to one position and to be automatically opened when moved to another position.

28. A device of the class described comprising a fuel tank provided with a partition and having an outlet passageway, and a pivotal member upon the tank having connections movable therewith and extending into the tank upon opposite sides of the partition in communication with said passageway, said connections being adapted to be closed when moved to one position and to be automatically opened when moved to another position.

29. A device of the class described comprising a fuel tank having oppositely arranged liquid holding compartments, an outlet connection upon the tank, and a pivoted member communicating with said outlet connection and having branch pipes extending into said compartment, said branch pipes being adapted to alternately open and close upon movement of said pivotal member in opposite directions.

30. A device of the class described comprising a fuel tank having an outlet passageway, a conduit adapted to swing within the tank and arranged to communicate with said passageway in different positions of adjustment, and a valve adapted to automatically open and close the conduit when swung between said positions.

31. A device of the class described comprising a fuel tank having an outlet passageway, a conduit adapted to swing within the tank and arranged to communicate with said passageway in different positions of adjustment, and a spring pressed valve adapted to swing with the conduit and coöperating with the tank to automatically open and close said conduit when swung between said positions.

32. A device of the class described comprising a suction producing apparatus, a fuel tank, a pipe connecting the same, a conduit adapted to swing within the tank and to communicate with said pipe when in different positions of adjustment, and a valve adapted to swing with the conduit and arranged to automatically open and close the same when moved from one position to another.

33. A device of the class described comprising a fuel tank having an outlet passageway, a pair of connected conduits adapted to swing within the tank and arranged to communicate with said passageway, and a valve adapted to swing with each of said conduits, said valves being arranged to alternately open and close the conduits when swung back and forth within the tank.

34. A device of the class described comprising a suction producing apparatus, a fuel tank, a pipe connecting the same, a pair of connected conduits adapted to swing within the tank and arranged to communicate with said pipe in different positions of adjustment, and a spring pressed valve adapted to swing with each of said conduits, said valves being arranged to coöperate with the tank to alternately open and close the conduits when swung back and forth within the tank.

In testimony whereof, we affix our signatures.

CHARLES F. GREEN.
HARRY W. LINDSEY, Jr.